Patented Oct. 27, 1942

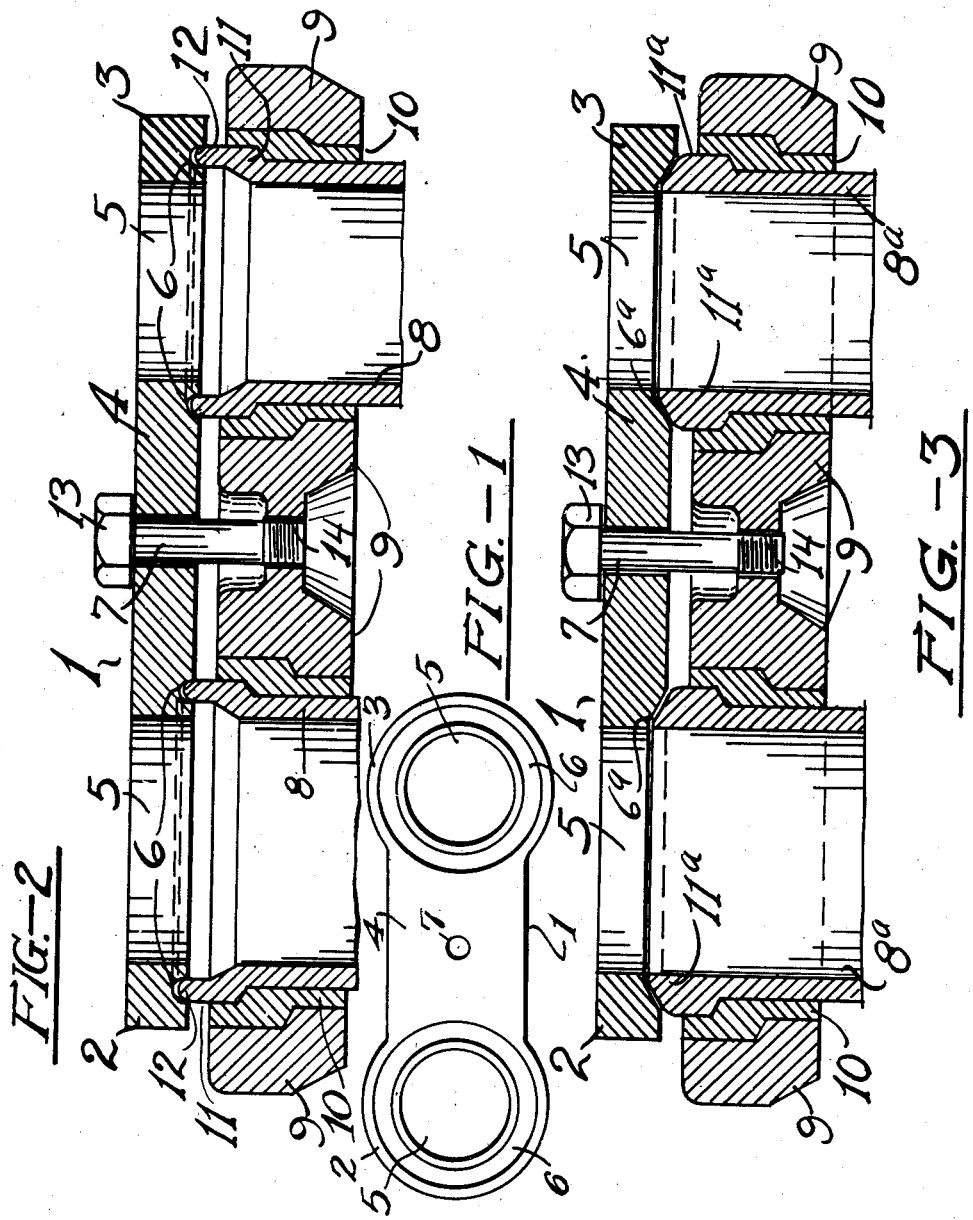

2,300,060

UNITED STATES PATENT OFFICE 2,300,060

PROTECTOR DEVICE

Robert B. Phillips, Baton Rouge, La., assignor to Standard Oil Development Company, a corporation of Delaware Application September 30, 1939, Serial No. 297,238

1 Claim. (Cl. 15—1)

The present invention relates to a means for facilitating the cleaning of furnace tubes, and more particularly the tubes of an oil cracking furnace in which severe deposition of carbonaceous materials takes place adjacent the tube ends. It is an object of this invention to provide a means for preventing rotation of such tubes in the tube sheet during the cleaning operation, and to protect the ends of the tubes from distortion or other damage which might prevent accurate and fluid-tight seating of return bend fittings normally connecting one tube end to another.

The invention and its objects may be fully understood from the following description when read in conjunction with the accompanying drawing, in which:

Fig. 1 is a plan view of a form of the device;

Fig. 2 is a vertical section through a portion of a setting showing an application of the device;

Fig. 3 is a similar view showing an adaptation of the device to a different tube setting.

Referring now to the drawing, the numeral 1 designates a tube end protector having end portions 2 and 3 spaced by a saddle or body portion 4. The end portions are substantially annular in form, the openings 5 therein having a diameter substantially equal to the diameter of the tubes to which the device is to be applied. Concentric with the openings 5, each end portion is provided with a machined circular groove 6, having a radius of curvature and a wall conformation suitable for engagement with a tube protruding from a tube sheet in the conventional manner. In the saddle 4, a passage 7 is provided through which a bolt may be extended to suitably engage the support for the tubes and maintain a rigid engagement between the tubes and the protector.

In Fig. 2, the protector device 1 is shown as applied to a pair of tubes 8 set in a yoke 9 and substantially held in engagement therewith by means of split rings 10. In the structure shown, the tubes are provided with offset ends 11 so that the diameter of the tubes between lips 12 is greater than internal diameter of the tubes themselves. In this situation, a protector is used which is similar in every detail with that shown in Fig. 1. The grooves 6 are of a conformation designed to provide a close fit with the tube lips 12, while the openings 5 are of the same diameter as the inner diameter of the tubes. As shown, the protector is maintained in rigid relationship to the tubes by means of the bolt 13 extended through the passage 7 into threaded engagement with the yoke or tube support 9 as at 14. When so disposed, the frictional contact between the tube ends and the surface of the grooves 6 prevents turning of the tubes in the tube support when a rotating reamer is used to remove deposits therein. Likewise, the protective covering of the tube ends or lips, prevents accidental contact of the cleaning tools which might deform the ends in any manner.

In Fig. 3, there is shown a protector having the same general characteristics of that shown in Figs. 1 and 2, but which has been adapted for use with tubes having a uniform inner diameter. As shown, the tubes 8a have flanged ends 11a substantially conical in conformation. In this instance, the grooves 6 of the protector shown in Figs. 1 and 2 are replaced by a shouldered inwardly tapered portion 6a in the walls of the openings 5. Otherwise the device illustrated is similar to that illustrated by either Fig. 1 or Fig. 2, and its function is identical.

Obviously the device as described may be variously modified to conform to the conditions under which it is to be used, without departing from the inventive concept involved, and it is not intended that the invention shall be limited by anything set forth above for the purpose of illustration, but only by the appended claim.

I claim:

A detachable, one-piece clean out protector for the ends of paired cracking coil tubes which does not remain on the tubes during a cracking operation, which includes a flat protector element consisting of an elongated body having spaced tube-engaging members at each end thereof, said tube engaging members having apertures extending therethrough, said aperture in each member having a diameter substantially equal to the inside diameter of a cracking coil tube, said protector element adjacent each of said apertures and concentric therewith being provided with a channel for engaging the ends of the cracking coil tubes in direct metal to metal contact, the cracking coil tubes being held in spaced relation by a tube support engaging shoulders on the exterior of the cracking coil tubes, and means for securing said flat protector element intermediate its ends to the tube support for rigidly holding the protector in position on the ends of the cracking coil tubes during cleaning of the cracking tubes to remove carbonaceous deposits therefrom whereby the cracking coil tubes are prevented from rotation during cleaning and the ends of the cracking coil tubes are protected from distortion or damage which would prevent fluid tight seating of return bend fittings normally connecting one cracking coil tube end to another.

ROBERT B. PHILLIPS.